(12) United States Patent
Raduenz et al.

(10) Patent No.: US 7,380,544 B2
(45) Date of Patent: Jun. 3, 2008

(54) EGR COOLER WITH DUAL COOLANT LOOP

(75) Inventors: Dan R. Raduenz, Union Grove, WI (US); Steven P. Meshenky, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 11/437,987

(22) Filed: May 19, 2006

(65) Prior Publication Data

US 2007/0267000 A1 Nov. 22, 2007

(51) Int. Cl.
*F02M 25/07* (2006.01)
*F02B 47/08* (2006.01)
*F28F 3/00* (2006.01)
*F02B 33/44* (2006.01)

(52) U.S. Cl. .................. 123/568.12; 165/166

(58) Field of Classification Search ........... 123/568.11, 123/568.12; 60/605.2; 165/158, 165, 166, 165/172, 178
See application file for complete search history.

(56) References Cited

U.S. PATENT DOCUMENTS

| | | | |
|---|---|---|---|
| 4,179,892 A | 12/1979 | Heydrich | |
| 5,607,010 A | 3/1997 | Schönfeld et al. | |
| 5,720,341 A | 2/1998 | Watanabe et al. | |
| 6,244,256 B1 | 6/2001 | Wall et al. | |
| 6,360,532 B2 | 3/2002 | Strahle et al. | |
| 6,742,335 B2 | 6/2004 | Beck et al. | |
| 6,935,319 B2 * | 8/2005 | Aupperle et al. | 123/568.12 |
| 7,059,308 B2 | 6/2006 | Eitel et al. | |
| 2004/0074480 A1 * | 4/2004 | Chen et al. | 123/568.12 |
| 2005/0188965 A1 * | 9/2005 | Usui | 123/568.12 |
| 2006/0231243 A1 * | 10/2006 | Sugihara et al. | 165/158 |

FOREIGN PATENT DOCUMENTS

JP 2006125357 A * 5/2006

* cited by examiner

*Primary Examiner*—Willis R. Wolfe, Jr.
(74) *Attorney, Agent, or Firm*—Michael Best & Friedrich

(57) ABSTRACT

An integrated exhaust gas recirculation (EGR) cooler with dual coolant loops comprises an exhaust gas inlet and an exhaust gas outlet for recirculating exhaust gas. An exhaust gas flow path extends between the exhaust gas inlet and the exhaust gas outlet to direct recirculating exhaust gas from the exhaust gas inlet to the exhaust gas outlet. A first coolant flow path extends between a first coolant inlet and a first coolant outlet to direct a first coolant flow from the EGR cooler in heat exchange relation with the exhaust gas flow path. A second coolant flow path extends between a second coolant inlet and a second coolant outlet to direct a second coolant flow through the EGR cooler in heat exchange relation with the exhaust gas flow path.

29 Claims, 2 Drawing Sheets

EGR COOLER WITH DUAL COOLANT LOOP

CROSS REFERENCE TO RELATED APPLICATIONS

There are no related applications.

FIELD OF THE INVENTION

This invention relates to an exhaust gas recirculation cooler and, more particularly, the use of integrated dual coolant loops for cooling recirculating exhaust gas.

BACKGROUND OF THE INVENTION

Emission concerns associated with the operation of internal combustion engines, generally, but not always, diesel engines, have resulted in an increased emphasis on the use of exhaust gas heat exchange systems with such engines, particularly, but not always, in vehicular applications. These systems are employed as part of an exhaust gas recirculation (EGR) system by which a portion of an engine's exhaust is returned to its combustion chambers via its intake system. The result is that some of the oxygen that would ordinarily be inducted into the engine as part of its fresh combustion air charge is displaced with inert gases thus reducing the rate of $NO_x$ formation. EGR systems are frequently designed to recirculate the cooled exhaust gas, thus lowering the combustion temperature and providing a reduction in $NO_x$.

In many applications employing EGR systems, exhaust gas recirculation coolers are employed. In the usual case, engine coolant is brought into heat exchange relation with the exhaust gas to lower its temperature prior to recirculation. Conventional EGR coolers use a single coolant loop to cool the exhaust gas. Most of the heat is absorbed by the coolant over the first few inches of the cooler. This raises the coolant temperature and makes the heat exchange less effective over the length of the cooler as the differential temperature between the coolant and exhaust gases become smaller.

The present invention is directed to improvements in EGR cooler operation to further reduce exhaust gas outlet temperatures.

SUMMARY OF THE INVENTION

In accordance with the invention, there is provided an integrated exhaust gas recirculation (EGR) cooler with dual coolant loops for cooling recirculating exhaust gas.

In accordance with one aspect of the invention, an integrated EGR cooler with dual coolant loops comprises an exhaust gas inlet and an exhaust gas outlet for recirculating exhaust gas. An exhaust gas flow path extends between the exhaust gas inlet and the exhaust gas outlet to direct recirculating exhaust gas from the exhaust gas inlet to the exhaust gas outlet. A first coolant flow path extends between a first coolant inlet and a first coolant outlet to direct a first coolant flow from the EGR cooler in heat exchange relation with the exhaust gas flow path. A second coolant flow path extends between a second coolant inlet and a second coolant outlet to direct a second coolant flow through the EGR cooler in heat exchange relation with the exhaust gas flow path.

It is a feature of the invention that the second coolant flow path is downstream of the first coolant flow path with respect to the exhaust gas flow path.

It is another feature of the invention that each of the first coolant flow path and the second coolant flow path run in parallel with the exhaust gas flow path.

It is still another feature of the invention that each of the first coolant flow path and the second coolant flow path run counter to the exhaust gas flow path.

It is still another feature of the invention that one of the first coolant flow path and the second coolant flow path runs in parallel with the exhaust gas flow path and the other of the first coolant flow path and the second coolant flow path runs counter to the exhaust gas flow path.

It is an additional feature of the invention that the first coolant path has a different length than the second coolant flow path.

It is still another feature of the invention that the EGR cooler is of stacked plate construction.

There is disclosed in accordance with a further aspect of the invention an EGR system with dual coolant loops for use with an engine having an engine exhaust gas recirculation outlet and an engine exhaust gas recirculation inlet. The EGR system comprises an exhaust gas inlet connected to the engine exhaust gas recirculation outlet for receiving recirculating exhaust gas. An exhaust gas outlet is connected to the engine exhaust gas recirculation inlet for returning cooled recirculating exhaust gas. An exhaust gas flow path extends between the exhaust gas inlet and the exhaust gas outlet to direct recirculating exhaust gas from the exhaust gas inlet to the exhaust gas outlet. A first coolant flow path extends between a first coolant inlet and a first coolant outlet to direct a first coolant flow through the EGR cooler in heat exchange relation with the exhaust gas flow path. A second coolant flow path extends between the second coolant inlet and the second coolant outlet to direct a second coolant flow through the EGR cooler in heat exchange relation with the exhaust gas flow path.

There is disclosed in accordance with another aspect of the invention the method of cooling exhaust gas recirculation (EGR) in an engine system having an engine exhaust gas recirculation outlet and an engine exhaust gas recirculation inlet. The method comprises providing an exhaust gas inlet connected to the engine exhaust gas recirculation outlet for receiving recirculating exhaust gas; providing an exhaust gas outlet connected to the engine exhaust gas recirculation inlet for returning cooled recirculating exhaust gas; and providing an integrated heat exchanger including an exhaust gas flow path extending between the exhaust gas inlet and the exhaust gas outlet to direct recirculating exhaust gas from the exhaust gas inlet to the exhaust gas outlet, a first coolant flow path extending between a first coolant inlet and a first coolant outlet to direct a first coolant flow in heat exchange relation with the exhaust gas flow path, and providing a second coolant flow path extending between a second coolant inlet and a second coolant outlet to direct a second coolant flow in heat exchange relation with the exhaust gas flow path.

Further features and advantages of the invention will be readily apparent from the specification and the drawings.

DETAILED DESCRIPTION OF THE INVENTION

Figure 1:
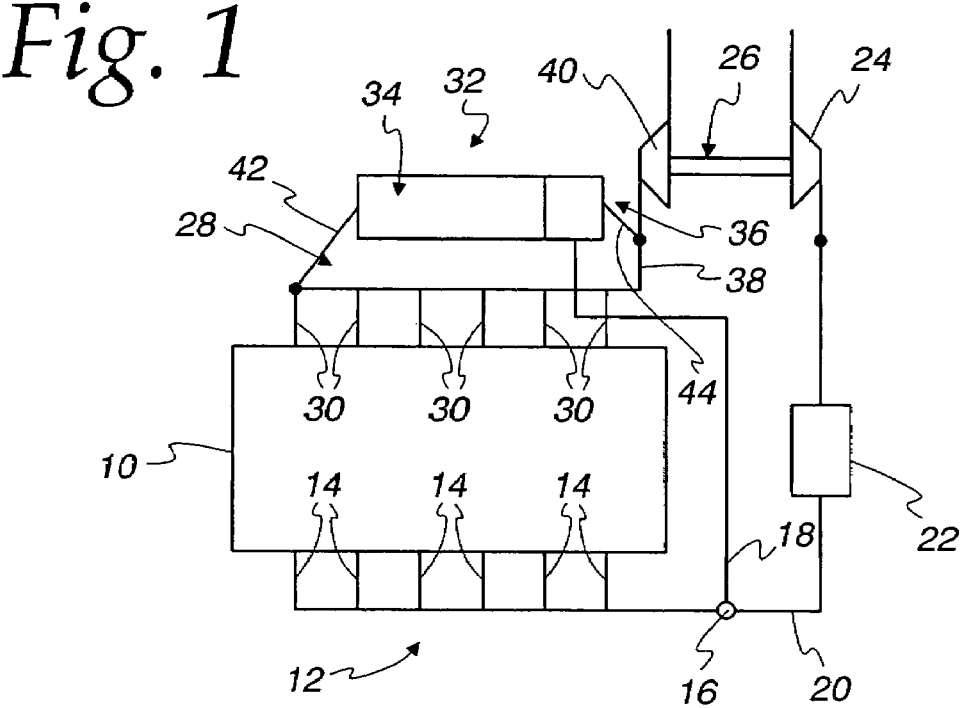
FIG. 1 is a schematic of a turbocharged internal combustion engine employing exhaust gas recirculation and including an exhaust gas recirculation (EGR) system according to the present invention.

Referring first to FIG. 1, an exemplary embodiment of an exhaust gas heat exchange system made according to the invention is described. The invention is described in the environment in which a typical diesel engine for a truck-like vehicle operates but it is to be understood that the invention is applicable to internal combustion engines other than diesel engines and may be employed in stationary engine applications as well as applications for engines other than trucks, as, for example, automobiles and construction, excavating, power generation, marine applications and others.

A six cylinder diesel engine is generally designated 10 and includes an intake manifold 12 having outlet connections 14 to each of the cylinders of the engine 10. The intake manifold 12 includes an inlet 16 for receiving recirculated exhaust gas from an exhaust gas recirculation line 18 as well as combustion air from a line 20. While a single inlet is illustrated, two separate inlets could be employed. Combustion air on the line 20 is received from a charge air cooler 22 which in turn receives combustion air from the compressor side 24 of a turbocharger, generally designated 26.

The engine 10 also includes an exhaust manifold 28 having a plurality of inlet connections 30, one to each of the cylinders of the diesel engine 10. An exhaust gas recirculation (EGR) system 32 in accordance with the invention includes an EGR cooler 34 and a bypass valve 36. The bypass valve 36 may be mounted on the EGR cooler 34, with both being mounted together on the manifold 28 in a conventional manner.

The exhaust manifold 28 includes a connection on a line 38 to the turbine side 40 of the turbocharger 26 to provide a driving force whereby compressed air is compressed in the compressor side 24 and delivered to the charge air cooler 22 for ultimate delivery to the intake manifold 12. Near the opposite end of the exhaust manifold 28 is an exhaust gas recirculation outlet to a connecting line 42 extending to the EGR cooler 34 and an exhaust gas flow path thereof. The opposite end of the exhaust gas flow path discharges at the bypass valve 36. A connecting line 44 connects another inlet of the bypass valve 36 to the connection line 38. The bypass valve 36 includes an outlet connected to the recirculation line 18. As is conventional, the bypass valve 36 is configured to direct cooled exhaust gas from the EGR cooler 34 to the recirculation line 18 or to direct uncooled exhaust gas from the exhaust manifold 28 to the recirculation line 18.

In accordance with the invention, the EGR cooler 34 comprises an integrated cooler with two separate and distinct coolant loops. This allows the first coolant loop to absorb the most heat over the first section of the EGR cooler 34. The second coolant loop or secondary loop may be cooled to a lower temperature than that of the first coolant loop to create a larger differential temperature between the exhaust gas and the coolant. This provides more heat rejection than that of a single coolant loop EGR cooler. Using two distinct coolant loops in a single EGR cooler provides greater heat rejection and enables a system designer to tailor the heat rejection.

Figure 2:
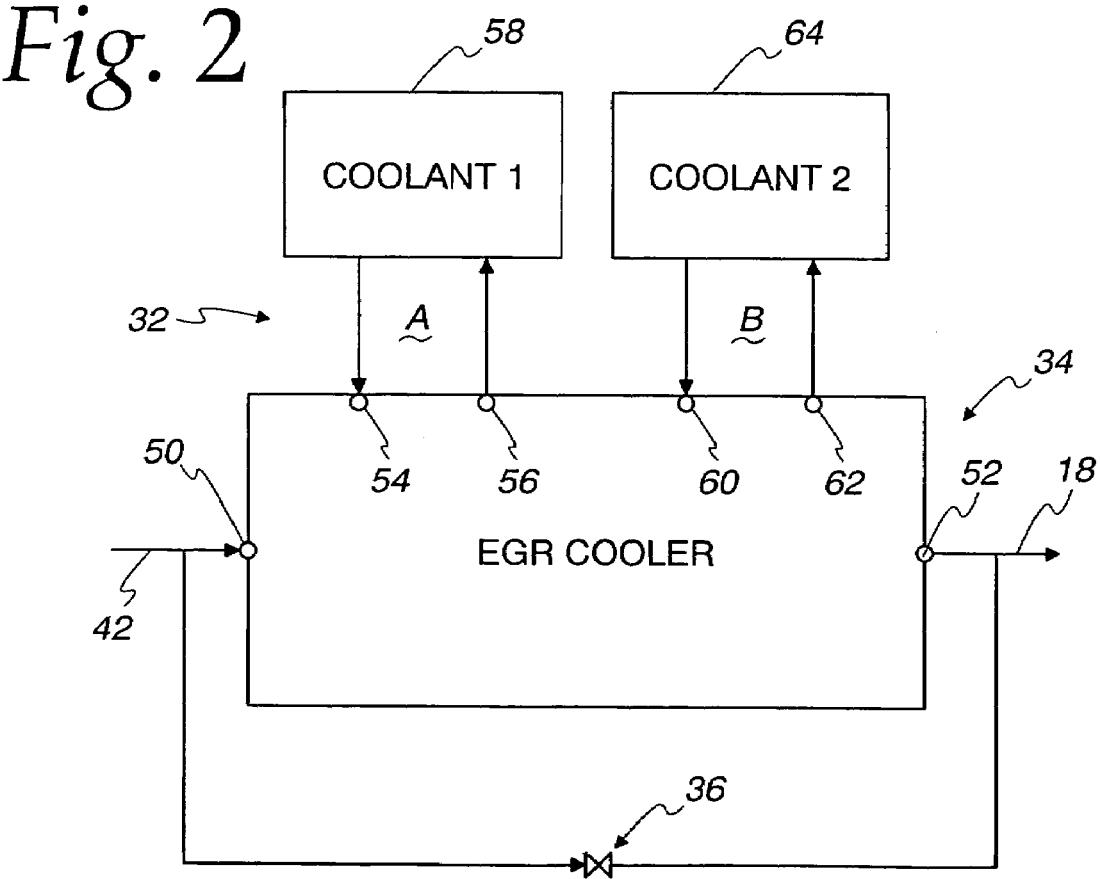
FIG. 2 is a block diagram of the EGR system of FIG. 1.

Referring to FIG. 2, the EGR system 32 comprises the EGR cooler 34 having an exhaust gas inlet 50 for connection to the engine exhaust gas recirculation outlet line 42 for receiving recirculated exhaust gas. An exhaust gas outlet 52 is connected to the engine exhaust gas recirculation inlet line 18 for returning cooled recirculating exhaust gas. The bypass valve 36 is illustrated in FIG. 2 as bypassing the EGR cooler 34, rather than being connected to the outlet 52 as described relative to FIG. 1. How a bypass valve is configured in the EGR system 32 does not form part of the invention and is illustrated by way of example only. An exhaust gas flow path extends between the exhaust gas inlet 50 and the exhaust gas outlet 52 to direct recirculating exhaust gas from the exhaust gas inlet 50 to the exhaust gas outlet 52.

The EGR cooler 34 includes a first coolant inlet 54 and a first coolant outlet 56. The first coolant inlet 54 and first coolant outlet 56 are operatively connected to a first coolant system 58 to define a first coolant loop A. The EGR cooler 34 also includes a second coolant inlet 60 and a second coolant outlet 62 both connected to a second coolant system 64 to define a second coolant loop B. As described more specifically below, the EGR cooler 34 includes a first coolant flow path extending between the first coolant inlet 54 and the first coolant outlet 56 to direct a first coolant flow from the first coolant system 58 through the EGR cooler 34 in heat exchange relation with the exhaust gas flow path. A second coolant flow path extends between the second coolant inlet 60 and the second coolant outlet 62 to direct a second coolant flow from the second coolant system 64 through the EGR cooler 34 in heat exchange relation with the exhaust gas flow path. The second coolant flow path is downstream of the first coolant flow path.

Each of the coolant systems 58 and 64 are conventional in design and may comprise a heat exchanger to cool the coolant, a pump and/or other appurtenances to remove heat from the coolant, as is known. Each coolant system 58 and 64 can use a different cooling media.

Figure 3:
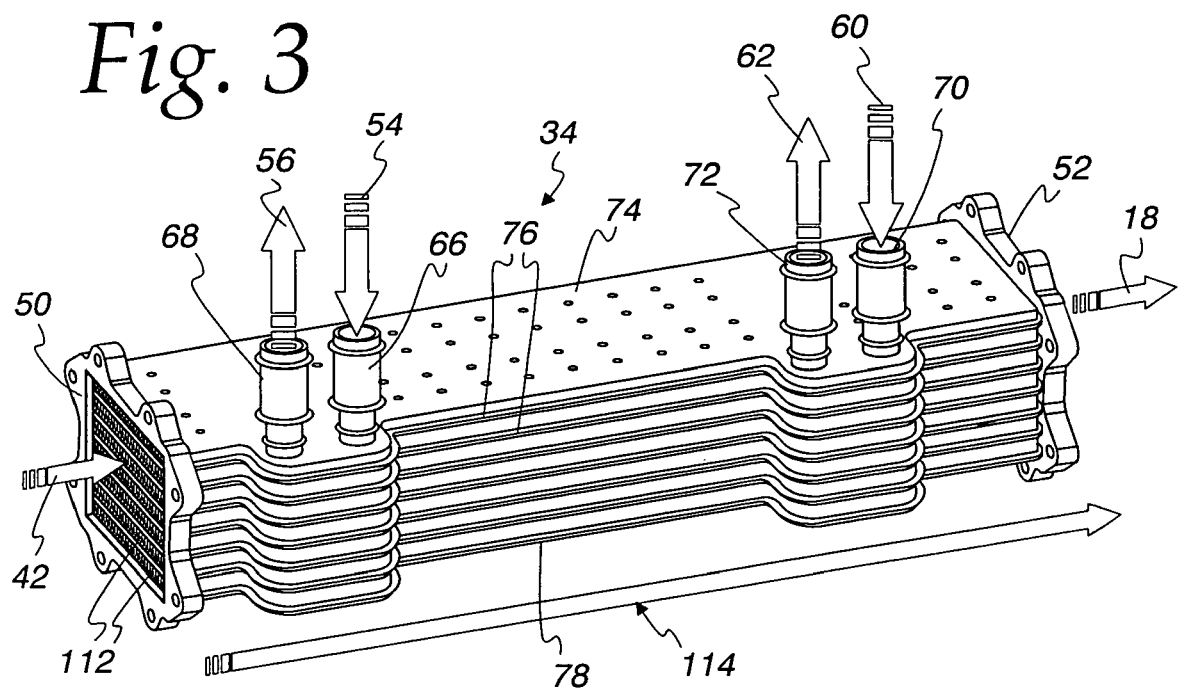
FIG. 3 is a perspective view of an EGR cooler of the EGR system of FIG. 2.

Referring to FIG. 3, an example of the EGR cooler 34 is illustrated. The EGR cooler 34 is of stacked plate construction. As is apparent, the EGR cooler 34 could use other types of construction, as will be apparent to those skilled in the art, such as tube construction, or the like. The stacked plate heat exchanger is illustrated as but one example.

A first set of ports 66 and 68 define the first coolant inlet 54 and first coolant outlet 56, respectively. A second set of ports 70 and 72 define the second coolant inlet 60 and second coolant outlet 62, respectively. The ports 66, 68, 70 and 72 are secured to an end plate 74. The EGR cooler 34 is otherwise made up of a series of stamped interior plates 76 and an opposite end plate 78.

Figure 4:
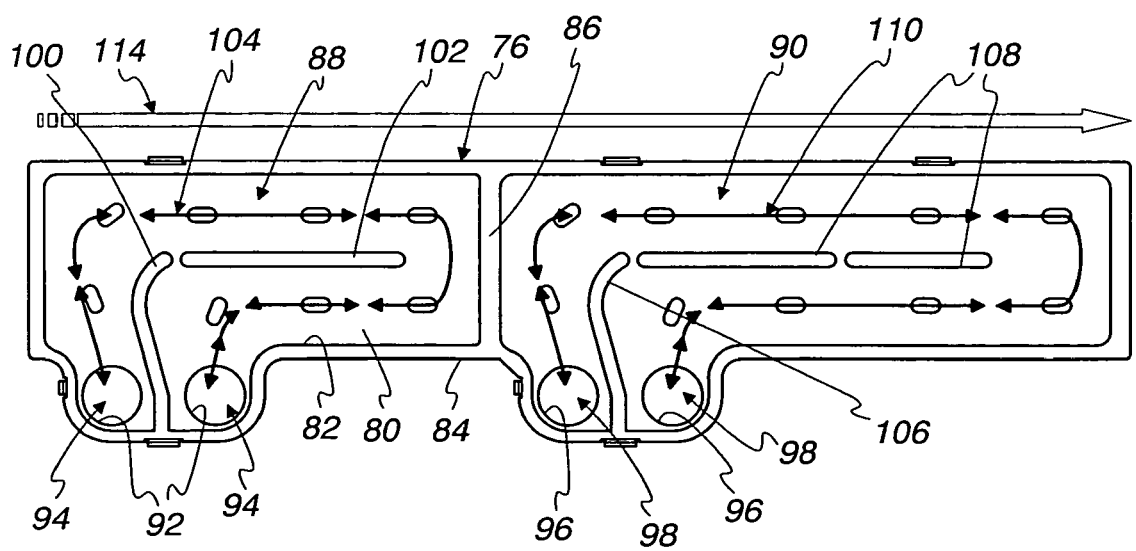
FIG. 4 is a top plan view of a plate of the EGR cooler of FIG. 3 illustrating an exhaust gas flow path and first and second coolant flow paths.

Referring to FIG. 4, one of the stamped interior plates 76 is illustrated. The plate 76 includes a relatively shallow depression 80 surrounded by upstanding peripheral walls 82 which terminate in outwardly directed peripheral flanges 84. An emboss 86 is stamped across the width of the plate 76 to create a first section 88 used for the first coolant loop A and a second section 90 used for the second coolant loop B. At two locations in the first section 88 cylindrical bosses 92 are provided. Each boss 92 defines a central aperture 94. The inlet and outlet ports 66 and 68 extend into the bosses 92 so as to allow for the entry and exit of coolant into the section 88. Similarly, the second section 90 includes cylindrical bosses 96 defining central apertures 98. The inlet and outlet bores 70 and 72 extend into the bosses 96 to allow for the entry and exit of coolant into the second section 90.

The first section 88 includes a first ridge 100 extending transversely and a second ridge 102 extending longitudinally. The ridges 100 and 102 define a flow path for the first coolant within the first section 88. As is conventional, the transverse ridge 100 defines localized cross flow, i.e., across the exhaust gas flow, represented by a line 114, and the longitudinal ridge 102 defines parallel (concurrent) flow, i.e., in line with and in the same direction as the exhaust gas flow, or counter flow, i.e., in line with and in the opposite direction as the exhaust gas flow. This coolant flow is illustrated by the arrowed lines 104. The lines 104 are illustrated as bidirectional as either central aperture 94 could be used as the inlet or the outlet.

Similarly, the second section 90 includes a first transverse ridge 106 and a pair of second longitudinally extending ridges 108. The ridges 106 and 108 define the second coolant flow path illustrated by the arrowed lines 110 which again, are illustrated to be bidirectional.

The present invention is not limited to any particular configuration of the individual coolant flow paths 104 and 110. As is known, the flow path is determined by the location of the central apertures 94 and 96 in the respective sections 88 and 90 as well as the configuration of the various ridges. For example, the coolant flow paths 104 and 110 could be defined to be primarily counter flow or primarily parallel flow by using longitudinal ridges and appropriately selecting location of the inlet relative to the outlet. Moreover, cross flow could also be used. Likewise, the coolant flow paths 104 and 110 can be the same or different from one another. In the illustrated embodiment of the invention, the first coolant flow path 104 has a shorter length than the second coolant flow path 110.

As is conventional with stacked plate heat exchangers, the plate 76 illustrated in FIG. 4 would be considered one plate of a pair to provide the first and second coolant flow paths 104 and 110. As is apparent, the plate 76 would be stacked with another plate which would be a mirror thereof to define the flow paths. As such, interior plates 76 are assembled in alternating fashion to produce the construction shown in FIG. 3 and the assembly is brazed to provide the coolant flow paths 104 and 106, as described. Between abutted pairs of the plates 76 exhaust gas passages 112 exist, two of which are identified in FIG. 3. Interior fins may be located in each of the exhaust gas flow paths. The exhaust gas flow path is in the direction illustrated by the arrow 114 of FIGS. 3 and 4 from the exhaust gas inlet 50 to the exhaust gas outlet 52.

In the illustrated embodiment, each of the plates 74, 76 and 78 is of one piece construction to provide an integrated EGR cooler 34 with dual coolant loops. The two coolant loops A and B are separate and do not mix. This provides the opportunity for the first and second coolant systems 58 and 64, see FIG. 2, to use two different types of fluids to reject heat. A coolant such as ethylene glycol could be used, as well as other types of fluids. A less efficient fluid or one tailored to handle boiling better can be chosen for the first coolant system 58 to make the heat absorption more linear and reduce the local differential and strain across the cooler. Each coolant loop could be run in parallel or counter flow or one in parallel on the other counter. As an example, the first coolant loop A can be set up in parallel to reduce the likelihood of boiling and the second cooling loop B can be set up in counter flow to maximize heat transfer. This allows the first coolant loop A to absorb the most heat over the first section 88 of the cooler 34. The second coolant loop B may be cooled to a lower temperature than that of the first coolant loop B to create a larger temperature differential between the exhaust gas and the coolant. This provides more heat rejection than that of a single coolant loop EGR cooler.

Thus, there is described an integrated exhaust gas recirculation cooler with dual coolant loops for cooling recirculating exhaust gas. The illustrated embodiment of the invention is intended to illustrate the basic concepts of the invention and is not intended to limit the scope of the invention.

We claim:

1. An integrated exhaust gas recirculation (EGR) cooler with dual coolant loops for cooling recirculation exhaust gas comprising:
   an exhaust gas inlet for recirculating exhaust gas;
   an exhaust gas outlet for recirculating exhaust gas;
   an exhaust gas flow path extending between the exhaust gas inlet and the exhaust gas outlet to direct recirculating exhaust gas from the exhaust gas inlet to the exhaust gas outlet;
   a first coolant inlet;
   a first coolant outlet;
   a first coolant flow path extending between the first coolant inlet and the first coolant outlet to direct a first coolant flow through the EGR cooler in heat exchange relation with the exhaust gas flow path;
   a second coolant inlet;
   a second coolant outlet; and
   a second coolant flow path extending between the second coolant inlet and the second coolant outlet to direct a second coolant flow through the EGR cooler in heat exchange relation with the exhaust gas flow path, wherein at least a portion of one of the first and second coolant flow paths is substantially counter to a flow of exhaust gas along the exhaust flow path.

2. The integrated EGR cooler of claim 1 wherein the second coolant flow path is downstream of the first coolant flow path relative to the exhaust gas flow path.

3. The integrated EGR cooler of claim 1 wherein the portion is a first portion, and wherein a second portion of the one of the first coolant path and the second coolant path is substantially parallel with the exhaust gas flow path.

4. The integrated EGR cooler of claim 1 wherein the portion is a first portion, and wherein a second portion of the one of the first coolant path and the second coolant path is substantially counter to the exhaust gas flow path.

5. The integrated EGR cooler of claim 1 wherein each of the first coolant path and the second coolant path runs in parallel with the exhaust gas flow path and the other of the first coolant path and the second coolant path runs counter to the exhaust gas flow path.

6. The integrated EGR cooler of claim 1 wherein the first coolant path has a different length than the second coolant path.

7. The integrated EGR cooler of claim 1 wherein the EGR cooler is of stacked plate construction.

8. The integrated EGR cooler of claim 1 wherein a temperature of a coolant entering the first coolant inlet is different than a coolant entering the second coolant inlet.

9. The integrated EGR cooler of claim 1 wherein the first coolant inlet is downstream of the first coolant outlet in the direction of a flow of exhaust along the exhaust flow path.

10. The integrated EGR cooler of claim 1 wherein the second coolant inlet is downstream of the second coolant outlet in the direction of a flow of exhaust along a flow of exhaust along the exhaust flow path.

11. The integrated EGR cooler of claim 1 wherein a temperature of a coolant entering the first coolant inlet is different than a temperature of a coolant entering the second coolant inlet.

12. An exhaust gas recirculation (EGR) system with dual coolant loops for use with an engine having an engine exhaust gas recirculation outlet and an engine exhaust gas recirculation inlet, the EGR system comprising:

an exhaust gas inlet connected to the engine exhaust gas recirculation outlet for receiving recirculating exhaust gas;

an exhaust gas outlet connected to the engine exhaust gas recirculation inlet for returning cooled recirculating exhaust gas;

an exhaust gas flow path extending between the exhaust gas inlet and the exhaust gas outlet to direct recirculating exhaust gas from the exhaust gas inlet to the exhaust gas outlet;

a first coolant inlet;

a first coolant outlet;

a first coolant flow path extending between the first coolant inlet and the first coolant outlet to direct a first coolant flow through the EGR cooler in heat exchange relation with the exhaust gas flow path;

a second coolant inlet;

a second coolant outlet; and a second coolant flow path extending between the second coolant inlet and the second coolant outlet to direct a second coolant flow through the EGR cooler in heat exchange relation with the exhaust gas flow path, the first coolant flow path having a different length than the second coolant flow path.

13. The EGR system of claim 12 wherein the second coolant flow path is downstream of the first coolant flow path relative to the exhaust gas flow path.

14. The EGR system of claim 12 wherein each of the first coolant path and the second coolant path run in parallel with the exhaust gas flow path.

15. The EGR system of claim 12 wherein each of the first coolant path and the second coolant path run counter to the exhaust gas flow path.

16. The EGR system of claim 12 wherein one of the first coolant path and the second coolant path runs in parallel with the exhaust gas flow path and the other of the first coolant path and the second coolant path runs counter to the exhaust gas flow path.

17. The EGR system of claim 12 wherein the first coolant path has a shorter length than the second coolant path.

18. The EGR system of claim 12 wherein the EGR cooler is of stacked plate construction.

19. The integrated EGR cooler of claim 12 wherein a temperature of a coolant entering the first coolant inlet is different than a coolant entering the second coolant inlet.

20. The integrated EGR cooler of claim 12 wherein the first coolant inlet is downstream of the first coolant outlet in the direction of a flow of exhaust along the exhaust flow path.

21. The integrated EGR cooler of claim 12 wherein the second coolant inlet is downstream of the second coolant outlet in the direction of a flow of exhaust along a flow of exhaust along the exhaust flow path.

22. The integrated EGR cooler of claim 12 wherein a temperature of a coolant entering the first coolant inlet is different than a temperature of a coolant entering the second coolant inlet.

23. A method of cooling a recirculating exhaust gas flow in an engine system having first and second coolant flow loops comprising:

rejecting heat from the recirculating exhaust gas flow to the first coolant flow loop in a heat exchanger; and rejecting heat from the recirculating exhaust gas flow to the second coolant loop in the heat exchangers, wherein rejecting heat includes directing exhaust gas between and along surfaces of adjacent stacked plates of a heat exchanger.

24. The method of claim 23 further comprising providing an integrated heat exchanger including an exhaust gas flow path extending between an exhaust gas inlet and an exhaust gas outlet to direct recirculating exhaust gas flow from the exhaust gas inlet to the exhaust gas outlet, a first coolant flow path extending between a first coolant inlet and a first coolant outlet to direct a first coolant flow in heat exchange relation with the exhaust gas flow path as part of the first coolant flow loop, and providing a second coolant flow path extending between a second coolant inlet and a second coolant outlet to direct a second coolant flow in heat exchange relation with the exhaust gas flow path as part of the second coolant loop.

25. The method of claim 24 wherein the second coolant loop is cooled to a lower temperature than the temperature of the first coolant loop.

26. The method of claim 24 wherein each of the first coolant path and the second coolant path run in parallel with the exhaust gas flow path.

27. The method of claim 24 wherein each of the first coolant path and the second coolant path run counter to the exhaust gas flow path.

28. The method of claim 24 wherein one of the first coolant path and the second coolant path runs in parallel with the exhaust gas flow path and the other of the first coolant path and the second coolant path runs counter to the exhaust gas flow path.

29. The method of claim 24 wherein the first coolant loop uses a different cooling media than the second coolant loop.

\* \* \* \* \*